Patented Apr. 27, 1954

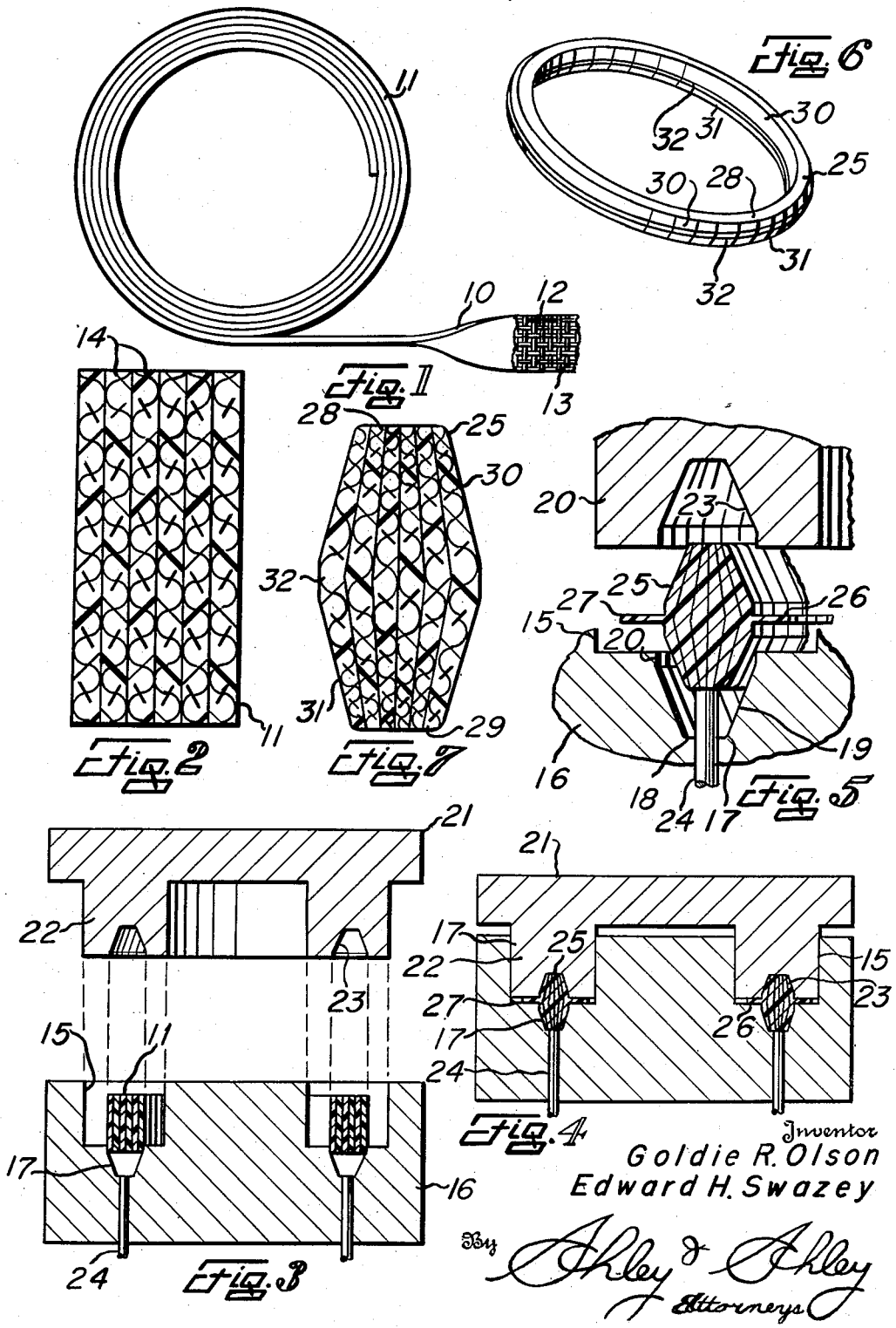

2,676,823

UNITED STATES PATENT OFFICE 2,676,823

SEALING RING

Goldie R. Olson, Shreveport, La., and Edward H. Swazey, Fort Worth, Tex., assignors to Plastic Engineering & Sales Co., Fort Worth, Tex., a corporation of Texas Application February 4, 1949, Serial No. 74,686

3 Claims. (Cl. 288—33)

This invention relates to new and useful improvements in sealing rings.

It is well known that by the use of insulated couplings, pipe lines or portions thereof may be electrically isolated from other portions or from valves, pumps or other equipment connected to said pipe lines. Often, it is desirable to electrically isolate a portion of a pipe line system so as to permit an effective and economical application of cathodic protection. Frequently, only a small section of a pipe line lies in highly corrosive soil and insulated couplings may be employed to concentrate drainage currents on this anodic or corrosive section, thereby eliminating the waste of electrical energy required if said section were not insulated from adjacent metallic structures. In pipe lines, long line currents have often been detrimental to and have appreciably shortened the life of the buried portions of the lines. Such currents have been broken up or reduced by installing insulated couplings at intervals throughout pipe lines. Although many dielectric materials will electrically insulate couplings or other types of connections effectively, it is most difficult to find a dielectric material having sufficient strength to withstand the compressive stresses generated by the tightening of the usual bolts and nuts. This is particularly true when high pressures are encountered, such as in oil and gas fields, and when it is necessary to employ flanged connections of the ring and groove type. Heretofore, it has been virtually impossible to insulate such connections because the dielectric ring had to be of a strength approaching that of a metallic ring in order to withstand extreme tightening and line pressures. In addition to eliminating electrolysis or galvanic action, it is essential that the ring be unaffected by corrosive liquids and gases encountered in oil, gas and other systems.

One object of the invention is to provide an improved sealing ring of dielectric material for electrically insulating adjacent metallic conduit members, such as pipe couplings, and which is of sufficient strength to withstand high pressures and compressive stresses.

Another object of the invention is to provide an improved sealing ring of dielectric material for packing off between the flanges of high pressure conduits so as to make it possible to electrically insulate said flanges from each other and eliminate electrolysis or galvanic action between the flanges and ring.

A particular object of the invention is to provide an improved sealing ring, of the character described, which is substantially non-elastic but which is sufficiently yieldable to offer amplified seating surfaces for sealing engagement with the adjacent surfaces of conduit members.

An important object of the invention is to provide an improved sealing ring, of the character described, which includes a molded plastic annulus having a plurality of axial, concentric laminae of woven resin-impregnated fibers whereby the ring is substantially non-compressible and non-elastic without being brittle and has strength characteristics approaching those of forged iron.

A further object of the invention is to provide an improved method of forming a sealing ring wherein a continuous flat coil of resin-impregnated, woven fibers is preformed and molded under heat and pressure so as to tightly compress and bond the convolutions together and produce an annulus of predetermined size and shape and having a uniform density.

Still another object of the invention is to provide an improved method of forming a sealing ring wherein a strip of woven material, impregnated with a thermo-setting resin, is wound in a continuous flat spiral and compressed under heat and pressure so as to intimately engage and bond its convolutions together into an annulus of predetermined size and cross-section and having concentric laminae.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a schematic view, showing the step of preforming or winding a strip of woven material into a flat coil or spiral in accordance with the invention, Fig. 2 is a cross-sectional view of a portion of the wound spiral or preform, Fig. 3 is a transverse, vertical, sectional view of the preform in a mold, Fig. 4 is a view, similar to Fig. 3, illustrating the molding step, Fig. 5 is a transverse, vertical, sectional view of a portion of the mold, showing the step of ejecting the molded ring, Fig. 6 is a perspective view of the molded ring, and Fig. 7 is a cross-sectional view of the molded ring.

This application is filed as a continuation-inpart of our copending application filed August 31, 1946, Serial No. 694,196, now abandoned.

In carrying out the method of the present invention, a strip or tape 10 of woven fibrous material or fabric is preformed into an annulus 11 by being wound, coiled or rolled around a mandrel or other cylindrical form (not shown). The material of the tape 10 is preferably woven glass fibers, which is commonly known as "Fiberglas" cloth, impregnated or treated with a thermosetting resin. Although a thermo-plastic resin could be employed, it is preferable to use a phenolic or other thermo-setting resin, such as a modified phenol formaldehyde, or melamine. Good results have been obtained when the resin content of the fabric is approximately thirty per cent by weight. As shown by the numerals 12 and 13, the individual fibers of the fabric tape extend at right angles to one another and longitudinally of and perpendicular to the longitudinal axis of said tape so as to be disposed parallel to the axis of the preform or annulus 11 in concentric laminae or layers 14 (Fig. 2). It is desirable to employ glass fibers due to their high tensile strength, but there are some organic, mineral and synthetic fibers which could be used, such as cotton, linen, asbestos, nylon and saran.

The width of the tape used in making the annulus is preferably slightly greater than the axial width or height of the completed ring and it has been found that the number of convolutions of said annulus is determined when the proper weight or volume is attained. The annulus is placed in the annular loading cavity 15 of a conventional plastic compression mold block or base 16. Below the cavity 15 and in communication therewith, the mold block 16 is provided with an annular mold cavity 17 having a predetermined cross-sectional shape. As is clearly shown in Figs. 3, 4 and 5, the mold cavity 17 includes an annular, flat, bottom wall 18 and outwardly and upwardly inclined side walls 19. The upper margins or edge portions of the side walls 19 are flattened so as to extend vertically or perpendicular to the bottom wall 18, as shown by the numeral 20. Overlying the mold base 16 is a mold block 21 having an annular punch or plug 22 complementary to the cavity 15 and adapted to engage therein. A mold cavity 23, substantially identical to the cavity 17, is formed in the plug 22 for receiving the upper portion of the annulus when said plug is engaged within the cavity 15 by lowering of the upper block as shown in Fig. 4. The internal and external diameters of the annulus is such that the same will engage within the outer portion of the cavity 17 and, upon lowering of the upper block, of the cavity 23. Although not shown, the mold blocks are provided with the usual steam passages. Ejector pins 24 are provided in the mold base 16 and are adapted to be projected through the cavity bottom wall 18 for ejecting the molded ring 25 from the cavity 17 (Fig. 5).

Although subject to variation, the annulus is molded into a ring under a pressure of approximately 10,000 pounds per square inch and at a temperature of approximately 300 degrees Fahrenheit. The time required for molding and curing a ring at this pressure and temperature is approximately fifteen minutes. Since the material employed will eventually cure itself at room temperatures, warming of the preformed annulus prior to molding is sometimes desirable and this is especially true in cold temperatures.

Since the preformed annulus 11 contains a greater quantity of material than the molded ring 25, the latter has inner and outer flashes 26 and 27. These flashes may be removed from the finished ring in any desirable manner or a portion of the same may be retained.

As is clearly shown in Figs. 6 and 7, the shape of the completed ring conforms substantially to that of the mold cavities 17 and 23. The transverse surfaces 28 and 29 are flat and parallel to each other, while the internal and external peripheral surfaces have complementary inclined end or edge portions 30 and 31 and flat medial portions 32. Since the edge portions of the peripheral surfaces are inclined or tapered toward the transverse surfaces 28 and 29, it is manifest that the transverse thickness of said ring is greatest at its medial portion. Of course, the cross-sectional shape of the ring is subject to variation, but the particular shape shown and described complies with established standards. The completed ring has a compressive strength in excess of 15,000 p. s. i. when compressed edgewise or axially, and 60,000 p. s. i. when a section of said ring is compressed transversely or with its laminae substantially flat. The tensile strength of the completed ring is in excess of 48,000 p. s. i. Total load tests of the ring showed its ability to withstand more than 120,000 pounds when compressed edgewise or axially between flat plates. When confined in ring grooves, the rings were still intact under a total load of 200,000 pounds which was the capacity of the test equipment.

It is pointed out that the laminae of the completed ring are disposed in concentric relation or substantially parallel to the axis of said ring. Thus, substantially homogeneous or unbroken lateral surfaces are provided and there are no interstices subjected to fluid under pressure. The axial disposition of the laminae is due to the fact that the width of the tape used in making the preformed annulus is only slightly greater than the height of the completed ring, whereby there is substantially no folding of said laminae upon compression of said annulus. Due to the tapered portions 30 and 31 of the ring, a full face sealing action is obtained by said portions substantially throughout their areas contacting the complementary surfaces of the ring grooves. This sealing action is in part due to the elasticity of the material of the ring. In addition to providing a seal which will withstand high pressures, the ring is substantially non-corrosive so as to be particularly adapted for use in oil and gas lines. Also, since the material of the ring is dielectric, the use of said ring electrically insulates the flanges of couplings from each other so as to eliminate electrolysis or galvanic action.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A molded sealing ring including, a continuous flat coil of woven glass fibers impregnated with a thermosetting resin for sealing the pores and bonding the convolutions thereof together, certain of the glass fibers extending circumferentially of and being substantially coextensive with the coil, said convolutions being intimately engaged under heat and extremely high pressure of the magnitude of 10,000 pounds per square inch to provide concentric laminae of woven glass fibers and thermosetting resin and an exterior coating of thermosetting resin.

2. A molded sealing ring including, an annulus having concentric laminae of woven glass cloth and a thermosetting resin, the laminae being intimately engaged and compressed under heat and extremely high pressure of approximately 10,000 pounds per square inch whereby the resin seals the pores of and bonds together the woven glass cloth laminae and coats the exterior of the ring.

3. A molded sealing ring as set forth in claim 2 wherein the side walls of the ring converge toward each end face of the ring, and the laminae of woven glass cloth and phenolic resin converge toward the ring end faces whereby said end faces are compact and dense.

References Cited in the file of this patent

UNITED STATES PATENTS

| Number | Name | Date |
| --- | --- | --- |
| 816,478 | Kirschning | Mar. 27, 1906 |
| 1,213,051 | Wickes | Jan. 16, 1917 |
| 1,622,048 | Pierson | Mar. 22, 1927 |
| 2,096,692 | Cilley | Oct. 19, 1937 |
| 2,169,516 | Balfe | Aug. 15, 1939 |
| 2,300,760 | Amigo | Nov. 3, 1942 |
| 2,360,830 | Denman | Oct. 24, 1944 |
| 2,455,215 | Beckwith et al. | Nov. 30, 1948 |
| 2,475,856 | Price | July 12, 1949 |
| 2,528,168 | Paulsen | Oct. 31, 1950 |

FOREIGN PATENTS

| Number | Country | Date |
| --- | --- | --- |
| 502,643 | Great Britain | of 1939 |

OTHER REFERENCES

"Thermosetting Plastic Laminates, I" Product Engineering, December 1948.

"Laminated Phenolic," Product Engineering, August 1940.